(No Model.)

C. W. SALADEE.
VEHICLE SPRING.

No. 281,561. Patented July 17, 1883.

WITNESSES
William Paxton
J. E. Gansmann

C. W. Saladee
INVENTOR
By Charles E. Foster
ATTORNEY

UNITED STATES PATENT OFFICE.

CYRUS W. SALADEE, OF TORRINGTON, CONNECTICUT.

VEHICLE-SPRING.

SPECIFICATION forming part of Letters Patent No. 281,561, dated July 17, 1883.

Application filed March 8, 1883. (No model.)

*To all whom it may concern:*

Be it known that I, CYRUS W. SALADEE, a citizen of the United States, and a resident of Torrington, in the county of Litchfield and State of Connecticut, have invented certain new and useful Improvements in Vehicle-Springs, of which the following is a specification.

My invention is a spring for vehicles, constructed of parallel plates or bars and cross-arms, as fully described hereinafter, the said spring being light in weight, elastic, and simple in its construction.

Figure 2:
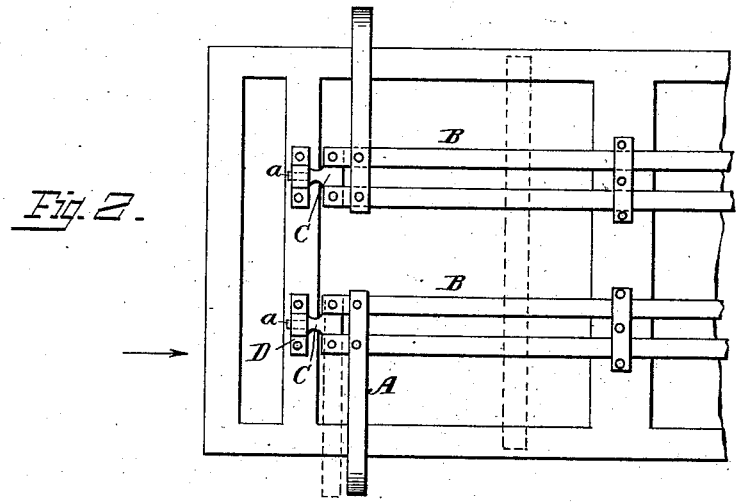
Figure 1:
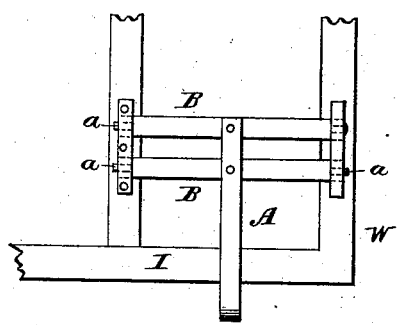
Figure 3:
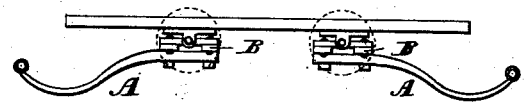
Figures 4, 5:
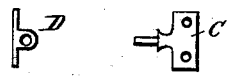

In the drawings, Figure 1 is an inverted plan of part of a body-frame with my improved spring attached thereto. Fig. 2 is an inverted plan of a body with a set of springs of modified construction. Fig. 3 is an end view, looking in the direction of the arrow, Fig. 2. Figs. 4 and 5 are detached detail views.

Two or more springs, B B, each a steel bar of any suitable cross-sectional form, are arranged parallel to each other, and secured at one or both ends, or at any suitable points. As shown in Fig. 1, they are secured at the ends to the frame I of the body W. The ends may be bolted directly to the frame, or they may be provided each with a projecting pin or journal, $a$, turning in a bearing on the frame, so that one spring is depressed while the other is elevated.

Across each pair or assemblage of springs, at the point preferably of the greatest flexion, extends an arm, A, secured to each spring at or near one end of said arm, and at the opposite end connected to the side bar or other fixed object.

Any change in the vertical position of the body will result in the vibration of the arm A and in the longitudinal bending of one spring in one direction and of the other in the opposite direction, with a resistance increasing as the bend increases. I thus secure a very free, easy, and resilient support, which can be made at a comparatively small cost, as straight-spring bars, which are light and inexpensive, are principally employed, and which is especially adapted to light wagons, to be used alone or combined with any other suitable springs.

The arm A may be placed near one end of the spring-bars, as shown in Fig. 2, in which case greater flexion is secured by using one journal, $a$, extending centrally from a head, C, to which all the springs are attached, the trunnion fitting a socket in a bearing-plate, D, secured to the body-frame; and, if desired, the head C may extend from or form a part of the arm A, as shown in dotted lines, Fig. 2. In such a structure there will be a slight torsional action of the springs, the general effect and result, however, being the same as that first described. The arms A are either rigid or flexible.

The arrangement of springs here shown may be longitudinal or transverse to the body, and side bars may or may not be used.

I claim—

1. The combination, in a spring for vehicles, &c., of two or more parallel spring-bars, each having one or more bearings, and a transverse arm connected at one end to both of said bars and at the opposite end to a stationary portion of the vehicle or other object, substantially as set forth.

2. The combination, in a spring, of parallel spring-bars, each rigidly connected at one point to the body and provided with a single journal-bearing at the end, and a transverse arm connected to and extending from the springs and connected to the frame or other support, substantially as specified.

In testimony whereof I have signed my name to this specification in the presence of two subscribing witnesses.

CYRUS W. SALADEE.

Witnesses:
C. L. MCNEIL,
H. E. HANSMANN.